Oct. 31, 1933.　　　　J. M. FAGAN　　　　1,933,322
MECHANICAL VACUUM LEAK DETECTOR
Filed Feb. 3, 1930　　　3 Sheets-Sheet 1

INVENTOR
J. M. FAGAN.
BY
ATTORNEY

Oct. 31, 1933.  J. M. FAGAN  1,933,322

MECHANICAL VACUUM LEAK DETECTOR

Filed Feb. 3, 1930  3 Sheets-Sheet 3

INVENTOR
J. M. FAGAN.
BY
ATTORNEY

Patented Oct. 31, 1933

1,933,322

UNITED STATES PATENT OFFICE 1,933,322

MECHANICAL VACUUM LEAK DETECTOR

James M. Fagan, Maplewood, N. J., assignor to Westinghouse Lamp Company, a corporation of Pennsylvania Application February 3, 1930. Serial No. 425,414

5 Claims. (Cl. 176—2)

This invention relates to a device for detecting leaks in fluid pressure systems and relates more particularly to a device for detecting leaks in hollow vessels such as incandescent electric lamp bulbs or the like subsequent to or during an evacuating operation.

Although the present invention is applicable for use in connection with pressure systems of various types it is especially adapted for use in connection with a vacuum line of an exhaust apparatus to provide an instrument sensitive to any given operating pressure and capable of causing the actuation of mechanism in accordance with variations in pressure.

In the manufacture of incandescent electric lamps an apparatus is employed which includes a rotary conveyor or spider of disc form having a plurality of exhaust ports disposed in spaced relation adjacent to its periphery. The exhaust ports are connected with a disc type valve which is operated to successively connect the various ports with pumps capable of removing the gases from bulbs disposed in the ports. It is necessary in order to produce electric lamps, to exhaust the bulbs to a relatively high degree of vacuum in order to maintain the desired quality of length of life during operation. In the operation of exhausting the bulbs it often happens that by reason of slight defects in the structural elements or during the fabrication of the bulb that slight leaks occur which admit gases and prevent the pumps from functioning to completely exhaust the bulbs.

If, therefore, lamp bulbs are moved through an exhausting schedule the gases admitted through leaks will not become evident until the lamps are tested, at which time they may be in the hands of the purchaser and fail to give the satisfaction which the manufacturer guarantees. Furthermore, if a leak occurs the vacuum lines receive an amount of gas which may enter the next succeeding bulb causing the pumps to fail to completely exhaust the same.

It has been the practice in connection with lamp evacuating mechanism to provide a leak detector in the form of a glass U tube one leg of which is connected to the line communicating with the interior of the bulb, the opposite leg having two electric terminals.

Mercury is disposed in the bend between the legs and the tubular portion or leg having the terminals is closed making a vacuum chamber to balance the mercury against the opposite side connected with the lamp. If a leak occurs in the lamp the pressure created forces the mercury into contact with the electric terminals which results in a flow of current through a solenoid which in turn operates mechanism to cut off the particular leaky bulb from the pump. Other mechanism also operates to cause the pumps to evacuate the line and free it from gases received from the leaky bulb.

It is the practice in connection with exhaust apparatus of the character above set forth to provide a preliminary or what is termed a backer pump which gives the lamps the initial exhaust down to a comparatively fine degree. After this preliminary exhaust the bulb is passed to what is termed the final exhaust being successively connected to either rotary or mercury final exhaust pumps.

Although a leak detector may be placed at any suitable point throughout the exhausting schedule, it has been found practical to subject the bulbs to a leak detecting operation after they have been exhausted by the preliminary pumps. Although the practice of employing a U tube and mercury column as above described for detecting leaks has given satisfactory results, it is desirable to have a device more sensitive and responsive to any operative pressure.

Furthermore, the use of a U tube which is generally made of glass is subject to breakage and requires considerable care as well as constant inspection to maintain a uniform supply of mercury which is dissipated.

It is an object of the present invention, therefore, to provide a rugged and durable vacuum leak detector sensitive to minute variations in pressure and capable of quick and accurate operation.

Another object of the invention is to provide a mechanical leak detector including a pressure responsive element for controlling mechanism to actuate means for cutting out and indicating a leaky vessel.

Another object of the invention is to provide a pressure responsive element for giving controlled, balanced and regulated operation and capable of adjustment in accordance with a predetermined pressure.

Other objects and advantages of the invention will be evident from the following description together with the accompanying drawings in which, Fig. 1 is a diagrammatic plan view of a vacuum system including a leak detector constructed in accordance with the present invention.

Fig. 2 is an enlarged elevational view partly in section showing the present leak detector mechanism.

Fig. 7 is a side elevational view party in section showing leak detector mechanism operable under atmospheric pressure.

Although the present invention may be employed for detecting leaks in vacuum systems or for detecting leaks in various forms of hollow bodies as for example, radio tubes, vacuum bottles or other vacuum devices, it is shown and described herein as applied to an apparatus for exhausting incandescent electric lamps.

Figure 1:
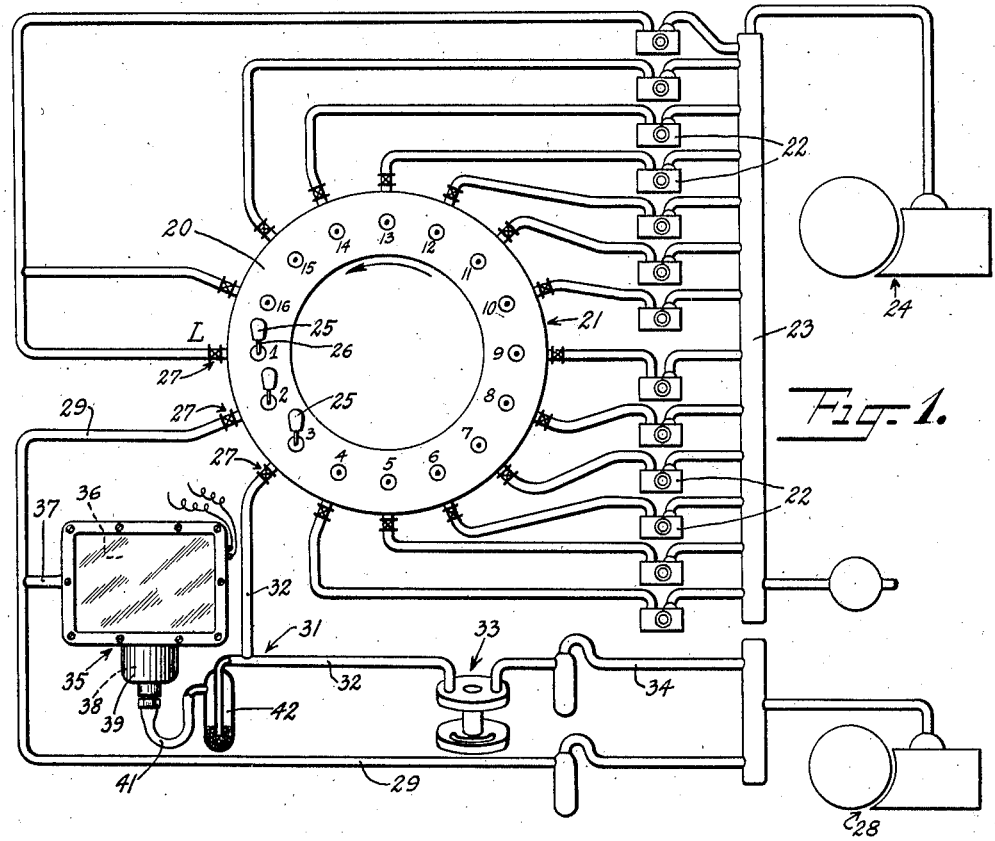

As illustrated in Fig. 1 lower half 20 of a rotary valve 21 is illustrated connected with a plurality of exhaust ports which are numbered 1 to 16. Exhaust ports 4 to 15 of the valve are arranged to communicate with pumps 22 which in turn are connected to a manifold 23 communicating with a backer pump 24. The positions 4 to 15 of the valve are used for giving a vessel what is termed the final exhaust operation.

For the purpose of clearness it may be stated here that in the manufacture of incandescent electric lamps a lamp bulb 25 is provided with an internal structure called the mount. This mount includes an exhaust tube 26 and is sealed to the bulb so that the exhaust tube extends therefrom and affords a means of communication to the interior of the bulb for an exhausting operation.

In practice a lamp bulb is applied to the machine at the loading position indicated by the letter "L" the exhaust tube being inserted into an exhaust port, as for example the port indicated by the numeral 1. The machine operates intermittently with sixteen movements to a cycle. At position 1 the lamp is received but no exhausting operation takes place inasmuch as a valve or pinch cock indicated by the numeral 27 is closed. At position 2 the pinch cock 27 is open and a lamp is placed in communication with a preliminary pump 28 by means of a conduit or pipe line 29. The bulb remains on the pump during the stationary stage of the conveyor during a determined period sufficient to evacuate the bulb.

The conveyor then moves the bulb to position 3 at which position the lamp is no longer in communication with the pump 28 through the conduit 29 but is placed in communication with what may be termed a closed line 31 which may be termed a closed system or chamber comprising a conduit 32, a normally closed valve 33 and conduit 34 which leads to the pump 28. At this point or stage it is desirable to test the bulb to determine whether or not the same has developed a leak and it will be evident that if a leak occurs the gas will enter the closed system 31 which has previously been evacuated by means to be hereinafter described which causes an opening of the valve 33 which connects the said closed system or system 31 with the pump 28.

Figure 3:
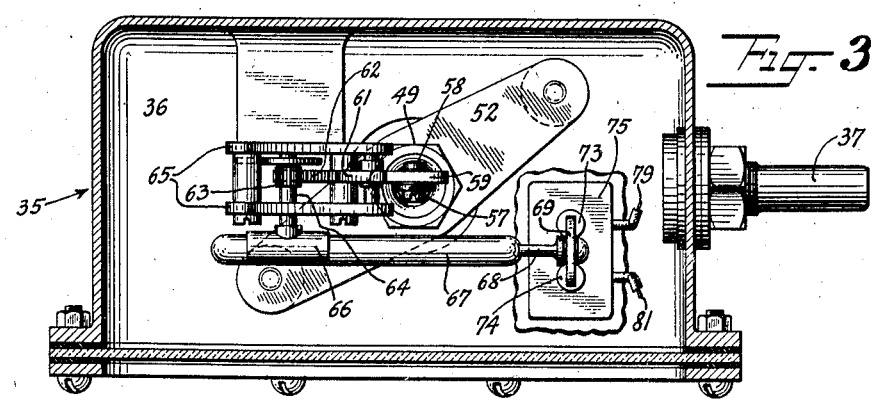
Fig. 3 is a view taken on line III—III in Fig. 2.
Figure 4:
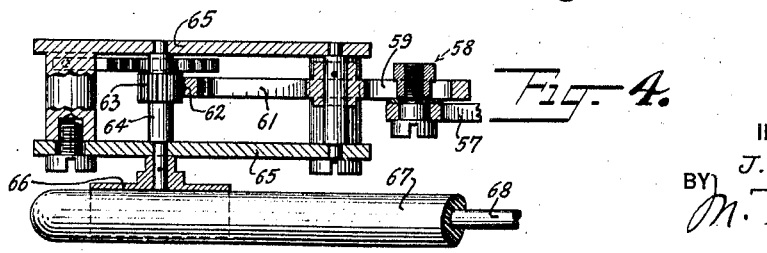
Fig. 4 is a view taken on line IV—IV in Fig. 2.

The present invention provides a leak detector mechanism indicated as a whole by the numeral 35. This mechanism comprises a vacuum chamber 36 in communication through a connection 37 with the pump 28 and a pressure responsive element 38 in the form of a diaphragm (see Fig. 2), disposed in a chamber 39 connected by a passage 41 with the conduit 32 and consequently the interior of the evacuated device. A suitable trap 42 may be provided in case a mercury pump is used so that any mercury which passes through the passage 31 will be absorbed and prevented from reaching the leak detector mechanism. The mechanism comprising the leak detector as more clearly shown in Figs. 2 to 4, may comprise the above mentioned diaphragm 38 which is preferably of the bellows type having a lower plate 43 secured to a central stem 44, extending upwardly into the vacuum chamber 36 and provided with a threaded end 45 to receive a flanged nut 46.

An adjustment of the nut 46 serves to limit the movement of the diaphragm since the periphery 47 of the flange is so proportioned as to engage a shoulder 48 after a given downward movement of the stem 44. An upward movement of the stem is limited by a stop nut 49 disposed in a threaded aperture 51 provided in a rigid arm 52 within the chamber 36. The stop nut is provided with a passage-way 53 into which the upper end 54 of the stem 44 extends.

It will be evident that the lower end 55 of the stop nut will engage with the flange nut 46 and limit the upward movement of the stem 44. Inasmuch as the chamber 36 is connected with the pump 28 and the chamber 39 is connected with the evacuated or closed circuit of the system the diaphragm 38 will be under balanced pressure and any slight variation in pressure within the chamber 39 will cause an actuation or flexure of the diaphragm with a consequent movement of the stem 44.

This movement of the stem is extremely slight and although the same may be utilized directly for the purpose of detecting leaks, it has been found desirable to amplify the movement for actuating other mechanism. For this purpose the upper end 54 of the stem is pivoted at 56 to one end of a link 57, the opposite end of the link is provided with a pin 58 disposed in a slot 59 at one end of a rocker arm 61. The opposite end of the rocker arm is provided with a gear segment 62 in mesh with a pinion 63 mounted on a shaft 64 journaled in a suitable bearing bracket 65.

Figure 5:
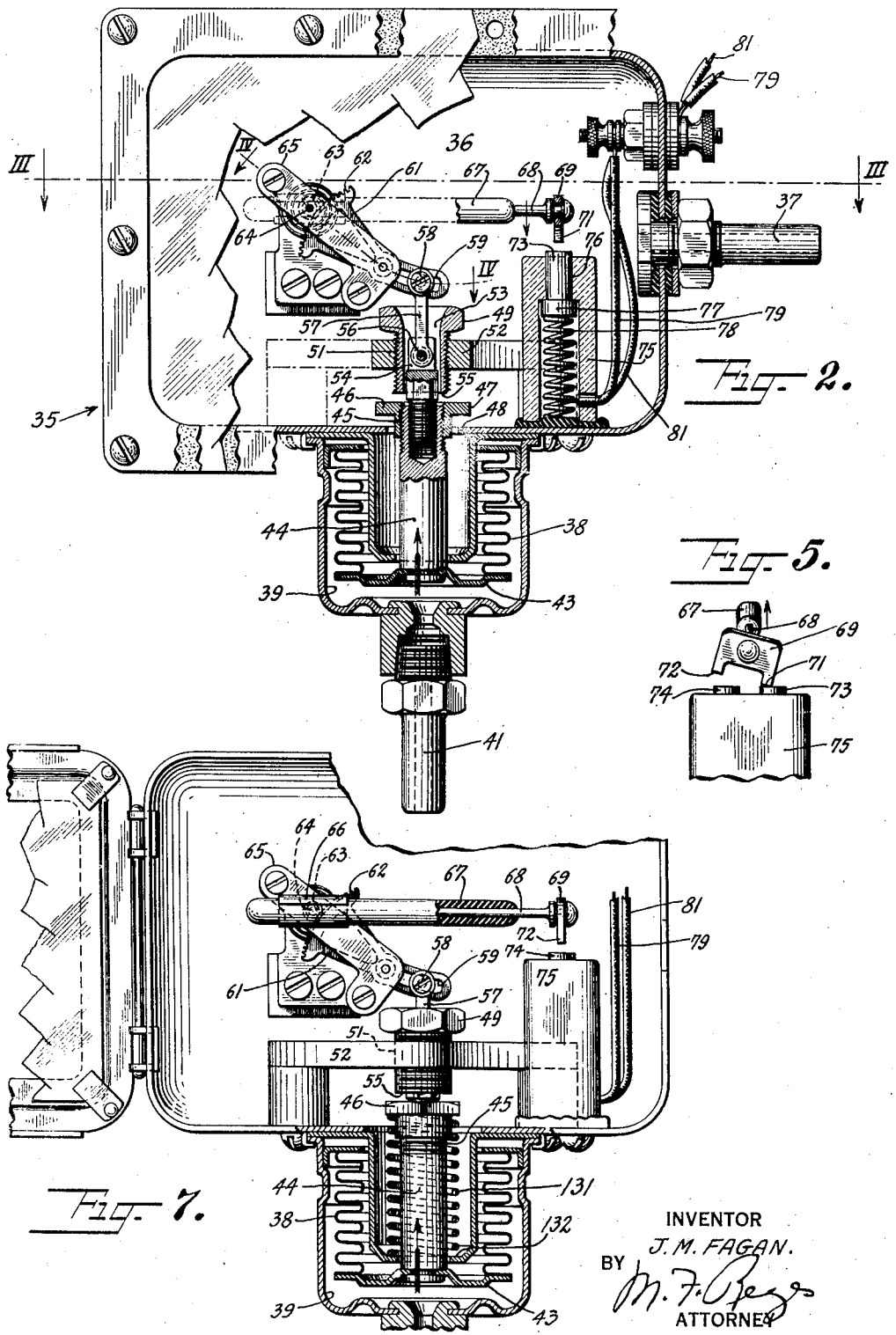
Fig. 5 is an enlarged detail view of an electrical contact element and contacts.

The shaft 64 is provided with a split sleeve or clamp 66 to receive an insulated rod constituting a rocker arm 67 having an end 68 provided with a bridging contact member 69 having contact faces 71 and 72 (see Fig. 5) to engage substantially stationary contacts 73 and 74. The bridging contact member 69 is pivotally attached to the rocker arm 67 so that when the said arm is moved by reason of the mechanism connecting it with the stem 44 the bridging contact member will more readily be removed from contact relation with the stationary contact 73 and 74.

It has been found that ordinarily the contacts have a tendency to stick and for the purpose of breaking or more readily removing the contact member 69 the same as above mentioned, is pivoted so that as the arm 67 lifts, the contact surface 71 or 72 which adheres the least will break first thus more easily breaking the second contact surface. Each of the contacts 73 and 74 are supported in a casing 75 and extend through an aperture 76 therein.

Figure 6:
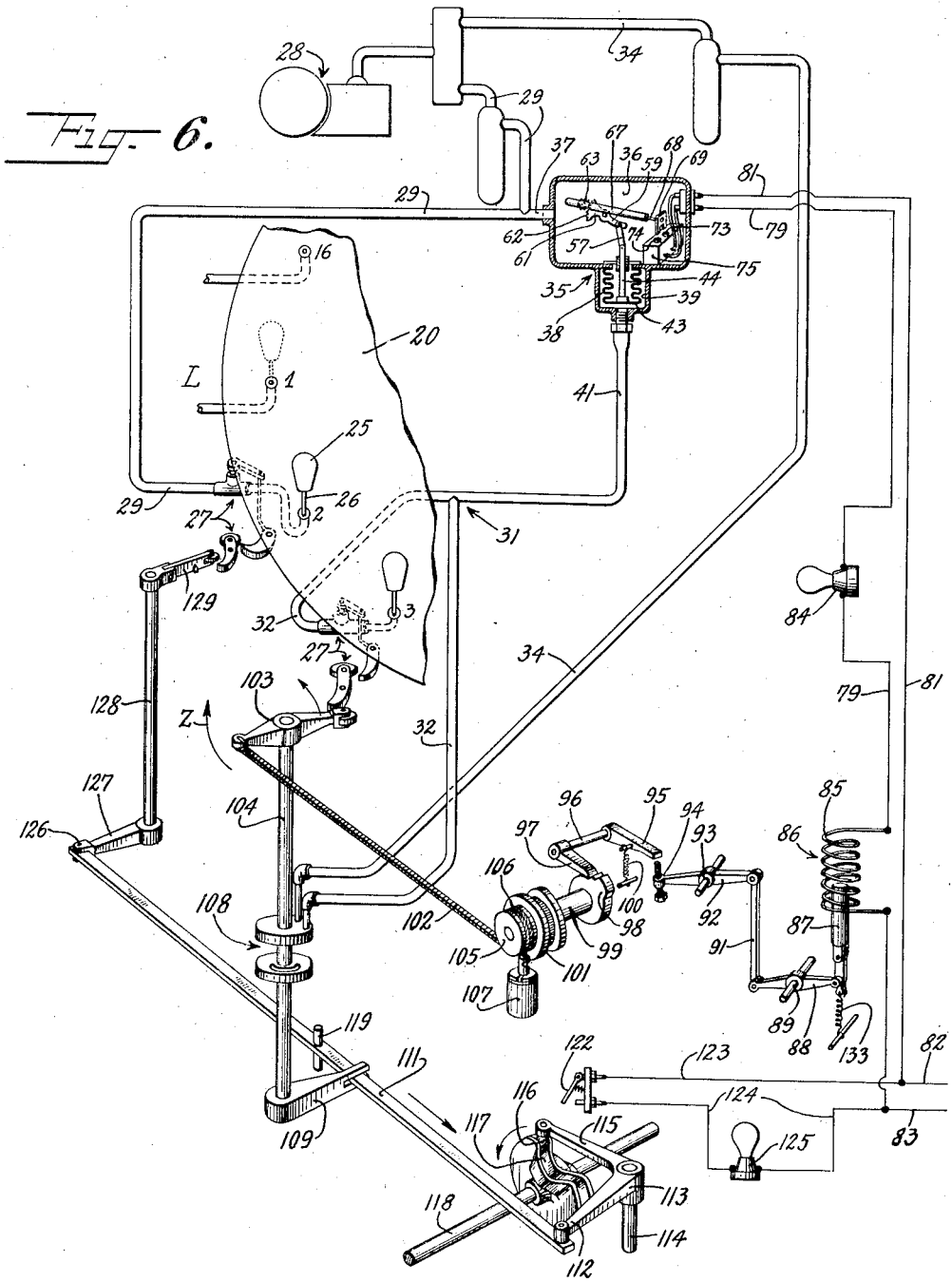
Fig. 6 is a diagrammatic perspective view of mechanism employed with a vacuum system including a leak detector constructed in accordance with the present invention.

Each contact is provided with a collar 77 which is engaged by a spring 78 to hold the contacts in their operating positions. Electrical conductors 79 and 81 are connected to the respective contacts 73 and 74 through the spring 78. The electrical conductor 81 as shown in Fig. 6 leads to one side 82 of a source of electrical energy and the conductor 79 leads to an opposite side 83 of a source of electrical energy. An indicator in the form of an incandescent lamp 84 and a coil 85 of a solenoid 86 are connected in series in the conductor 79 so that when the contact member bridges the contacts 73 and 74 electrical energy will flow through the lamp 84 and energize the coil 85. The lamp gives a visible signal or indication of the actuation of the leak detector.

The energized solenoid 86 causes an armature 87 to move and thus rock a lever 88 about its pivot 89. One end of the lever 88 is linked to the armature 87 and the opposite end is connected by an extension 91 with one end of a lever 92 pivoted at 93.

An opposite end 94 of the lever 92 is arranged to engage an arm 95 secured to one end of a shaft 96, the opposite end of the shaft is provided with a stop or dog 97 which engages a ratchet wheel 98 secured to one end of a shaft 99. A spring 100 serves to maintain the dog 97 in position to engage the ratchet wheel 98. The opposite end of the shaft 99 is provided with a pulley 101 upon which is wound one end of a flexible cable 102, the opposite end of the cable being secured to one end of a rocker arm 103 mounted on a vertical shaft 104. The shaft 99 is also provided with a drum 105 having wound thereon a cable 106 carrying a weight 107.

The shaft 104 may constitute an actuating element for a valve 108, the lower end of the said shaft 104 being provided with a slotted arm 109 embracing a pull rod 111. The pull rod 111 is connected to one arm 112 of a bell crank 113 mounted on a shaft 114, the opposite arm 115 of the bell crank is provided with a cam follower 116 disposed in a slot 117 of a cam mounted on a shaft 118.

The said shaft 118 is actuated through mechanism (not shown) causing a movement of the pull rod 111 which is provided with a contact pin 119 to engage the slotted arm 109 causing an opening of the valve 108 and a closing of a valve 27.

A movement of the rocker arm 103 operates to permit a movement of the weight 107 downwardly, which weight when in its downward position engages a spring-switch 122 connected with conductors 123 and 124, the said conductors being connected with conductors 82 and 83 to receive a source of electrical energy and an incandescent electric lamp 125 being connected in series in conductor 124 receives electrical energy and gives visible indication of an actuation of the above described mechanism.

In addition to the function of causing a closure of the valve 27 at position 3 of the conveyor the said pull rod operates to open valve 27 at position 2. For this purpose the said pull rod is pivotally connected at 126 with an arm 127 secured to a vertical shaft 128, the upper end of the shaft being provided with an arm 129 for actuating means for opening the valve 27.

The above detailed description is directed to the various mechanical elements and a description of operation will be given hereinafter.

As shown in Figs. 1 to 6 the leak detector is constructed so as to employ the vacuum line to create a vacuum at both sides of the diaphragm. If desirable, however, atmospheric pressure may be compensated for by means of the structure shown in Fig. 7. This structure is mechanically the same as the foregoing described mechanism but includes a helical spring 131 disposed about the stem 44. The spring 131 is disposed between the flange nut 46 and an annular shoulder 132 supported from the housing of the chamber 39.

An expansion of the spring 131 serves to lift the stem 44 which is secured to the plate 43 against atmospheric pressure. An adjustment of the spring to vary its tension may be accomplished by a manipulation of the nut 46, thus the spring may be finely adjusted in accordance with atmospheric conditions.

*Operation of exhaust machine*

In practice the machine is operated as follows:

The exhaust tube 26 of a lamp 25 is inserted into an exhaust port of the rotary valve 20. The conveyor then moves one stage of it travel bringing the lamp to position 2. At this position the lamp is connected with the open line or circuit 29 and the pump 28 operates to evacuate the said lamp.

The present machine having sixteen heads is preferably operated on what is termed a five second index allowing five seconds for the evacuation of the bulb and also for the subsequent operation of the leak detector. The rotary valve or conveyor then moves the lamp to position 3 thus cutting the lamp out of line 29 and putting it into communication with the closed circuit 31 which circuit is normally closed by reason of the closed valve 33.

The chamber 39 of the leak detector 35, is however, connected through passage 41 with the interior of the evacuated lamp. The vacuum chamber 36 of the detector is connected by means of the connection 37 with the open line 29. It will thus be evident that a vacuum is created on the opposite sides of the diaphragm 38. By reason of the adjustment elements the diaphragm may be set so as to be instantly sensitive to any differential of pressure and as long as the vacuum in the lamp is the same degree as was created therein when the lamp was on the pump, the diaphragm will remain inactive and the lamp will be moved by reason of the conveyor to positions 4, 5 etc., until it reaches position 15 at which position the lamp is sealed or tipped off by fires which fuse and close the exhaust tube. Mechanism for this purpose is well known and not shown herein.

Between positions 15 and 16 pinch cock mechanism (not shown) operates to close the exhaust port from the vacuum line and the portion of the exhaust tube remaining in the exhaust port is removed. A vacuum line as shown is connected to position 16 but this connection functions only to balance the valve and not to perform an exhausting operation. At position 1 before the conveyor again moves another lamp is inserted into the exhaust port. As previously stated the cycle again begins and the lamp is moved to position 2 and exhausted and is then moved to position 3 and placed into communication with the closed circuit 31.

*Operation of leak detector*

When the evacuated lamp is in position 3 and it happens that a leak occurs and air is admitted to the closed circuit 31, a difference in pressure will be created on opposite sides of the diaphragm 43 and the diaphragm will be flexed to lift the stem 44 causing the arm 61 to rock and rotate the pinion 63 thereby moving the rocker-arm 67 to bring the contact member 69 into engagement with the contacts 73 and 74. When this action occurs electrical energy flows through the coil 85 of the solenoid 86 and the armature 87 moves upwardly, causing an actuation of the mechanical train including lever 88. link 91, lever 92 which lever 92 trips the dog 97 permitting the weight 107 to fall causing a movement of the lever 103 which operates to close the valve 27 and thus cut the leaky lamp or other evacuated vessel from the line.

The weight also makes contact with the spring switch 122 closing the same thus lighting the lamp 125 and indicating that a leaky device is in the machine. The lever 103 being secured to shaft 104 a movement of the said lever causes a partial rotation of the shaft with the result that the valve 108 is opened and the arm 109 is moved into close proximity with the contact pin 119.

An opening of the valve 108 puts the normally closed system 31 in communication with the pump 28 which operates to clean the system or remove gases admitted from the leaky device. The conveyor may then be indexed to carry the leaky lamp with the valve 27 closed through a cycle but the lamp of course will not be in communication with the pumps and may be removed when it reaches the operator. In the meantime another lamp has been inserted at position 1 and has moved to position 2 for an evacuating operation and is ready to have valve 27 opened.

It will be understood that when the conveyor moves to position 16 mechanical means (not shown) closes the pinch cock or valve and the same must, therefore, be opened at position 2. The opening of this valve at position 2 is accomplished by the continuous rotation of the cam 117 which operates the bell crank 113 to reciprocate the pull rod 111 which in turn moves the lever arm 127 and causes an opening of the said valve 27 at position 2. This operation of opening the valve at position 2 is performed each time whether or not a leaky lamp has caused the leak detector to operate. If the leak detector has operated when the lever 109 will be positioned adjacent to the contact pin 119 and a movement of the pull rod 111 will cause the contact pin to engage arm 109 thereby effecting a partial rotation of the shaft 104 in the direction of the arrow "Z" closing valve 108 and causing the arm 103 to unwind the cable about the pulley 101 and wind the cable 106 about the drum 105 raising the weight 107 and positioning the ratchet wheel 98 to receive the dog 97. The dog 97 will be lifted by reason of the lever 92 but as a vacuum is again produced in the chamber 39 the diaphragm will be flexed so as to cause a downward movement of the stem 44 and thus lift the contact member 69 and break the electrical circuit terminating the flow of energy through the coil 85 and thus permitting the armature 87 to drop under the action of a spring 133 and thereby cause the dog 97 to engage the ratchet wheel 98 and thus re-set the detector for another operation.

By reason of the present mechanism a leak detector of simple construction and of extremely great sensitivity is produced. It is possible by means of the present mechanism to provide a balancing and regulating operation by means of the adjustable elements controlling the diaphragm which eliminates all lost motion and provides an efficient and effective device.

The present mechanism is free from the uncertainties that attend the use of a mercury column and does not have the disadvantage of breakage and the necessity of constant inspection and maintenance.

It has been found that a detector constructed in accordance with the present invention will operate at relatively high speed as for example at a five or even a two second intermittent cycle and has the advantage of being instantly re-set and provides a decided advance step in connection with vacuum systems.

Although a preferred embodiment of the invention is shown and described herein, it is to be understood that modifications may be made therein without departing from the spirit and scope of the invention as set forth in the appended claims.

1. An apparatus for evacuating hollow vessels comprising a vacuum pump, an open exhaust line and a normally closed exhaust line, means for connecting a vessel to said open line for an exhausting operation, means for transferring said vessel to said closed line, a diaphragm having one side subjected to the pressure of the vessel in said closed line, means controlled by a flexure of said diaphragm upon a leak in said vessel for operating mechanism to cut said vessel out of said line and means actuated by said last mentioned means for connecting said closed line with said pump for the removal of gas resulting from said leak.

2. A leak detector comprising a chamber, means for creating a given pressure in said chamber, a diaphragm subjected to said pressure, a stem extending from said diaphragm and movable upon a flexure of said diaphragm upon a variation in said pressure, a lever member having one end pivotally attached to said stem, a rocker arm pivotally attached to said lever member, an electrical circuit including contact members, a solenoid in said circuit for actuating said first mentioned means and a bridging contact on said rocker arm for engaging said contacts to energize said solenoid upon a flexure of said diaphragm.

3. A vacuum system comprising a rotary valve having ports to receive the exhaust tubes of lamp bulbs, vacuum pumps connected with said valve, means for moving said valve to position a bulb in communication with a pump for an exhausting operation, a leak detector comprising a chamber, a diaphragm in said chamber, means for creating a vacuum in said chamber to the same degree as created in said bulb, a normally open electrical circuit including the coil of a solenoid, a pair of contact members in said circuit, means operable when said solenoid is energized to actuate said means for creating a vacuum in said chamber, and means operable upon a movement of said diaphragm upon a leak in said bulb for bridging said contacts to energize said solenoid.

4. A system for evacuating lamp bulbs comprising a chamber having two compartments, a bulb in communication with one compartment, means for evacuating said bulb and said compartments to a given degree, means for transferring the bulb into communication with the other compartment and means responsive to a difference in pressure between the said compartments if a leak occurs in said bulb.

5. A system for evacuating lamp bulbs comprising a chamber having two compartments, a bulb in communication with one compartment, means for evacuating said bulb and said compartments to a given degree, means for transferring the bulb into communication with the other compartment, means responsive to a difference in pressure between the said compartments if a leak occurs in said bulb and means for removing gas from said compartment resulting from said leak.

JAMES M. FAGAN.